United States Patent
Blanco et al.

(10) Patent No.: US 10,914,238 B2
(45) Date of Patent: Feb. 9, 2021

(54) AIR TURBINE STARTER AND STARTING METHOD THEREOF

(71) Applicant: GE AVIATION SYSTEMS LLC, Grand Rapids, MI (US)

(72) Inventors: Ruben Blanco, Queretaro (MX); Saul Ledesma, Queretaro (MX)

(73) Assignee: GE Aviation Systems LLC, Grand Rapids, MI (US)

( * ) Notice: Subject to any disclaimer, the term of this patent is extended or adjusted under 35 U.S.C. 154(b) by 117 days.

(21) Appl. No.: 16/068,137

(22) PCT Filed: Jan. 20, 2016

(86) PCT No.: PCT/US2016/014089
§ 371 (c)(1),
(2) Date: Jul. 5, 2018

(87) PCT Pub. No.: WO2017/127068
PCT Pub. Date: Jul. 27, 2017

(65) Prior Publication Data
US 2019/0017484 A1    Jan. 17, 2019

(51) Int. Cl.
*F02C 7/277* (2006.01)
*F01D 19/00* (2006.01)

(52) U.S. Cl.
CPC .............. *F02C 7/277* (2013.01); *F01D 19/00* (2013.01); *F02N 2200/041* (2013.01);
(Continued)

(58) Field of Classification Search
CPC .... F02C 7/26; F02C 7/268; F02C 7/27; F02C 7/275; F02C 7/277; F01D 19/00;
(Continued)

(56) References Cited

U.S. PATENT DOCUMENTS 2,871,708 A * 2/1959 Raver ............... F02N 15/06
74/6
4,799,354 A * 1/1989 Midgley ............ F02C 7/26
416/32
(Continued)

FOREIGN PATENT DOCUMENTS

DE    10029714 A1    12/2001
EP    0623741 A1    11/1994
(Continued)

OTHER PUBLICATIONS

Japanese Office Action issued in related Japanese Patent Application No. 2018-537642, dated Aug. 6, 2019.
(Continued)

*Primary Examiner* — Gerald L Sung
*Assistant Examiner* — Stephanie Cheng
(74) *Attorney, Agent, or Firm* — McGarry Bair PC

(57) ABSTRACT

An air turbine starter (ATS) assembly includes a rotatable pinion gear (72) wherein the rotatable pinion gear is coupled to a combustion engine (10), a speed sensor (78) measuring the rotational speed (302) of the rotatable pinion gear (72), a torque sensor (79) providing a torque output (304) indicative of a torque experienced by the pinion gear (72), and a controller module configured to operate a starting sequence for the ATS assembly such that the rotational speed (302) is controllably increased while the torque output (304) is kept below the start sequence torque threshold (310).

14 Claims, 5 Drawing Sheets

(52) U.S. Cl.
CPC .. *F02N 2200/042* (2013.01); *F02N 2300/102* (2013.01); *F02N 2300/104* (2013.01); *F05D 2260/85* (2013.01)

(58) Field of Classification Search
CPC ...... F01D 25/34; F01D 25/36; F05D 2260/85; F02N 11/0807; F02N 11/08; F02N 15/10; F02N 2200/041; F02N 2200/042; F02D 2300/102; F02D 2300/104
See application file for complete search history.

(56) References Cited

U.S. PATENT DOCUMENTS

| | | | | |
|---|---|---|---|---|
| 9,316,195 | B2 * | 4/2016 | Puri | F02N 11/08 |
| 9,845,734 | B2 * | 12/2017 | Zeiner | F02C 7/277 |
| 2002/0163197 | A1 * | 11/2002 | Koelle | F02N 11/08 |
| | | | | 290/38 E |
| 2006/0053913 | A1 * | 3/2006 | Sinn | F02N 15/10 |
| | | | | 74/6 |

FOREIGN PATENT DOCUMENTS

| | | |
|---|---|---|
| EP | 1270933 A1 | 1/2003 |
| EP | 2514949 A2 | 10/2012 |
| EP | 2757236 A1 | 7/2014 |
| JP | H11117836 A | 4/1999 |
| JP | 2013015093 A | 1/2013 |
| JP | 2014519575 A | 8/2014 |
| WO | 2014149088 A2 | 9/2014 |
| WO | 2015156761 A1 | 10/2015 |

OTHER PUBLICATIONS

Christopher Mineau, Authorized Officer, Written Opinion of the International Searching Authority issued in related PCT Patent Application No. PCT/US2016/014089, 8 pages, dated Aug. 2, 2018, Munich, Germany.

* cited by examiner

AIR TURBINE STARTER AND STARTING METHOD THEREOF

BACKGROUND OF THE INVENTION

A combustion engine, such as a reciprocating internal combustion engine or a turbine engine, is an engine that uses combustion of a fuel to generate a self-sustaining operation that converts the potential energy stored in the fuel into a kinetic motion, such as a rotating motion.

Combustion can occur, for example, in an air/fuel mixture exposed external ignition, such as a spark generated by a spark plug. During combustion, the explosion of the air/fuel mixture generates heat in the combusted gases, and the resulting expansion of the gases drives kinetic motion. In the example of a reciprocating combustion engine, the resulting expansion of the gases drives a piston stroke in a pressurized chamber, creating rotational motion on a crankshaft. In the example of a continuous combustion engine, such as gas turbine engine, the resulting expansion of the gases drives a turbine downstream from a combustion section of the engine, creating rotational motion on a rotatable shaft.

In the aforementioned examples, the resulting rotational motion on the crankshaft or rotatable shaft, respectively, can further be utilized to achieve the self-sustaining operations. For instance, in the example of the reciprocating combustion engine, the crankshaft continues to rotate following the combustion, readying the piston in the pressurized chamber for another combustion stroke. In the example of the turbine engine, the rotatable shaft is rotatably coupled with a turbine upstream from the combustion section, which is used to compress intake air for further combustion.

An air turbine starter (ATS) can be used to initiate the rotation of the combustion engine. The ATS is often mounted near the engine and can be coupled to a high pressure fluid source, such as compressed air, which impinges upon a turbine wheel in the ATS causing it to rotate at a relatively high rate of speed. The ATS includes an output shaft that is coupled to the turbine wheel, typically through a reducing gear box, to the engine. The output shaft thus rotates with the turbine wheel. This rotation in turn causes a rotatable element of the combustion engine (e.g. the crankshaft or the rotatable shaft) to begin rotating. The rotation by the ATS continues until the combustion engine attains a self-sustaining operating rotational speed.

BRIEF DESCRIPTION OF THE INVENTION

In one aspect, a method of starting a combustion engine started with a starter includes, during a start sequence of the combustion engine, monitoring, by a controller module, a speed parameter indicative of a rotational speed of the starter rotationally coupled with the combustion engine and a torque parameter indicative of a torque of the starter, determining, in the controller module, whether the monitored speed parameter exceeds a corresponding speed value included in a start sequence speed profile and whether the monitored torque parameter exceeds a start sequence torque threshold, and in response to determining the monitored speed parameter does not exceed the corresponding speed value of the start sequence speed profile and the monitored torque parameter does not exceed the start sequence torque threshold, controllably increasing the rotational speed of the starter by the controller module such that the increasing prevents the monitored torque parameter from satisfying the start sequence torque threshold.

In another aspect, a method of starting a combustion engine includes, during a start sequence of the combustion engine, controlling a rate of acceleration of a turbine air starter pinion rotatably coupled with the combustion engine, by a controller module, monitoring, by the controller module, a torque parameter indicative of a torque experienced by the pinion during the controlling the rate of acceleration, determining, in the controller module, whether the monitored torque parameter satisfies a start sequence torque threshold, in response to determining the monitored torque parameter satisfies the start sequence torque threshold, controllably reducing the rate of acceleration of the pinion, and ceasing the start sequence upon the combustion engine attaining self-sustaining operating rotational speed.

In yet another aspect, a turbine air starter assembly includes a housing defining an interior with an air inlet and an air outlet defining a flow path through the housing, a rotatable turbine located within the flow path within the interior, a controllable pressure valve located upstream from the rotatable turbine, a rotatable pinion gear rotatably coupled with the rotatable turbine, wherein the rotatable pinion gear extends exteriorly of the housing and operably coupling to a combustion engine, a torque sensor providing a torque output indicative of a torque experienced by the pinion gear, and a controller module. The controller module is configured to, during a start sequence of the combustion engine, monitor a speed parameter indicative of a rotational speed of the turbine air starter assembly and a torque parameter indicative of a torque of the turbine air starter assembly, determine whether the monitored speed parameter exceeds a start sequence speed profile and whether the monitored torque parameter exceeds a start sequence torque threshold, and in response to determining the monitored speed parameter does not exceed the start sequence speed profile and the monitored torque parameter does not exceed the start sequence torque threshold, controllably increasing the rotational speed of the turbine air starter by the controller module such that the increasing prevents the monitored torque parameter from satisfying the start sequence torque threshold.

DESCRIPTION OF EMBODIMENTS OF THE INVENTION

Embodiments of the invention can be implemented in any suitable environment including, but not limited to, an environment using a combustion engine. A combustion engine can include, for example, a reciprocating combustion engine, or a continuous combustion engine, regardless of whether the combustion engine provides a driving force or is used for another purpose, such as to generate electricity. Examples of a continuous combustion engine can include, but is not limited to, a gas turbine engine. Such a combustion engine can be fueled by gasoline, kerosene, natural gas, methane, or diesel fuel. A preliminary understanding of a combustion engine is provided, wherein the combustion engine is in the example form of a reciprocating engine.

Figure 1:
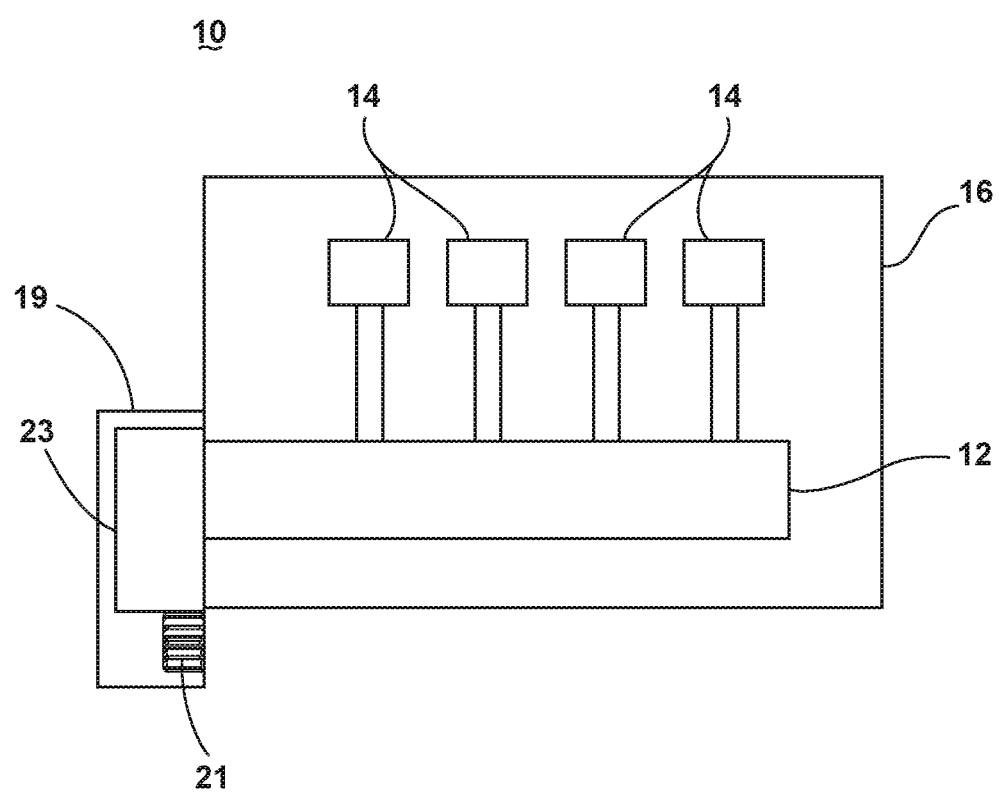
FIG. 1 is a schematic view of a combustion engine having a crank shaft that can utilize an air starting system in accordance with various aspects described herein.

FIG. 1 illustrates a schematic view of a combustion engine 10 in the form of a reciprocating engine, such as a, having a rotatable shaft, such as a crankshaft 12, and at least one piston 14 located within an engine block 16. While a reciprocating engine 10 is described for understanding, embodiment of the disclosure are additionally applicable in any combustion engine configured to be started into self-sustaining operation with a rotating element. A gearbox 19 having a spline gear 21 or ring gear and one or more internal gears or gear train 23 can be included and operably coupled with the crankshaft 12. As better illustrated in FIG. 2, the piston 14 located within the corresponding portion of the engine block 16 can include a piston head 15 rotatably coupled with a piston shaft 17, with the piston head being slidable within a piston chamber 18. The piston shaft 17 is rotatably coupled to a pin on the crankshaft 12, which is radially offset from a rotation axis of the crankshaft, such that rotation of the crankshaft 12 causes a reciprocation of the piston head 15 within the piston chamber 18.

Figure 2:
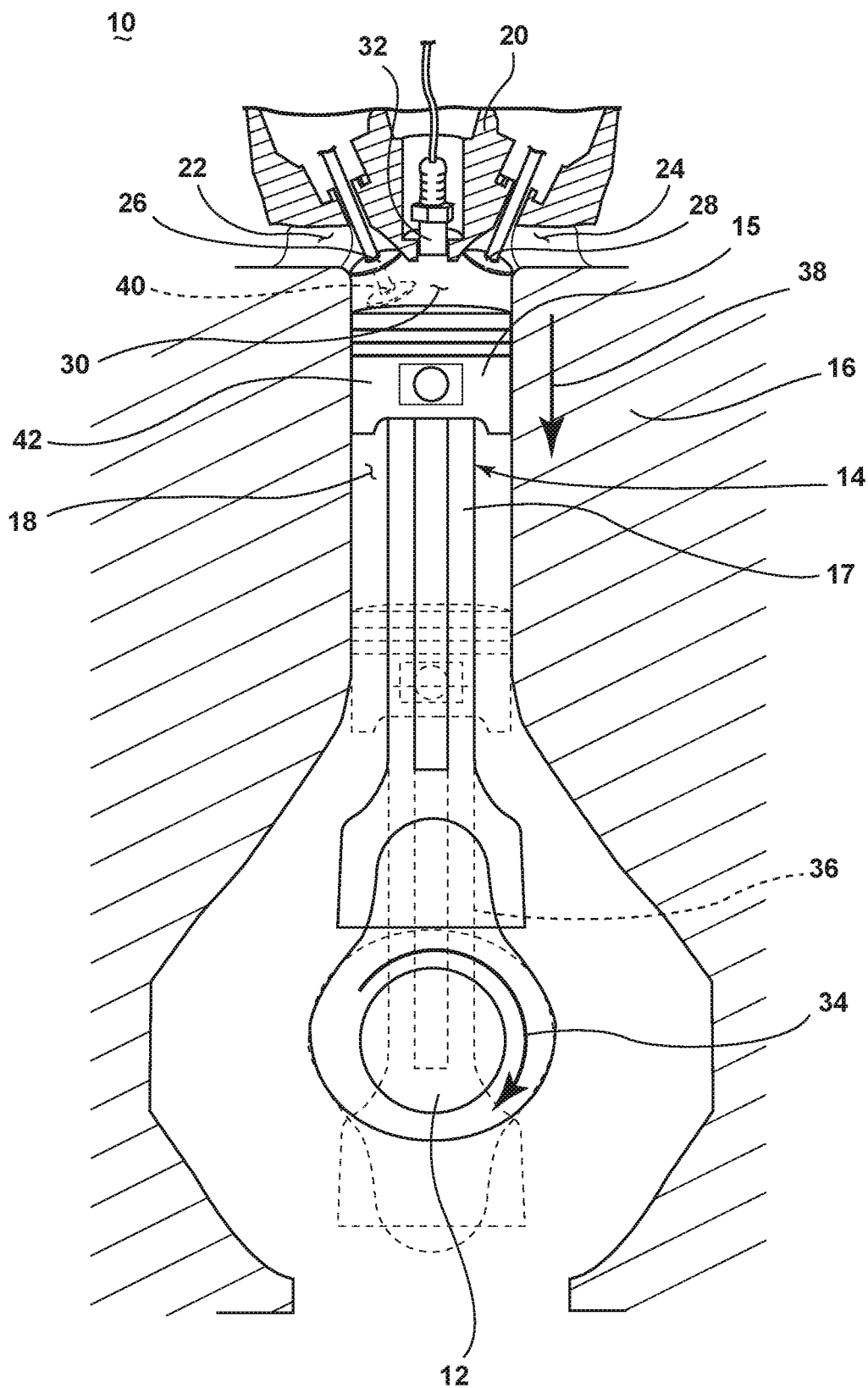
FIG. 2 is a schematic cross-sectional view of a piston in a combustion engine such as the engine of FIG. 1.

While only one piston 14 is shown in FIG. 2, a combustion engine 10 typically has multiple pistons 14 contained within corresponding piston chambers 18, with the pistons 14 being mounted to different pins on the crankshaft 12, with the pins being radially spaced about the rotational axis of the crankshaft 12. The pistons 14 can be arranged in one or more linear rows, where an engine with only one row of linearly aligned pistons 14 being referred to as an inline arrangement. Engines 10 with multiple rows of pistons 14 can have an angular spacing between the rows forming. The pistons 14 can also be radially spaced about the crankshaft 12, which is often referred to as a radial arrangement.

The movement of the piston 14 into or out of the piston chamber 18 can, hereafter, be described as "strokes" or "piston strokes." While the disclosure can contain descriptions of "upward" strokes, wherein the piston 14 is moved farther into the piston chamber 18, away from the crankshaft 12, and "downward" strokes, wherein the piston 14 is removed from the piston chamber 18 toward the crankshaft 12, embodiments of the invention can include a combustion engine 10 having vertical, or angled strokes. Thus, the phrases "upward" and "downward" are non-limiting, relative terms for embodiments of the invention.

As shown, the combustion engine 10 can further include an engine head portion 20 having a sealable air intake passage 22 and a sealable exhaust passage 24. The passages 22, 24 are fluidly coupled with and sealable from the piston chamber 18 via a respective intake valve 26, and exhaust valve 28. Collectively, the piston head 15, engine block 16, head portion 20, intake valve 26, and exhaust valve 28 can define a sealable, compression chamber 30.

The head portion 20 can further include a fuel spray nozzle 32 for injecting a fuel, such as diesel fuel into the compression chamber 30 for combustion. While a fuel spray nozzle 32 for injecting diesel fuel is shown, alternative embodiments of the invention can include the fuel spray nozzle 32 optionally replaced by, in the example of a gasoline or natural gas engine, a spark plug for igniting an air/fuel or air/gas mixture for the combustion engine 10.

In one example, such as a combustion cycle, the combustion engine 10 can include four piston strokes: an intake stroke, a compression stroke, a combustion stroke, and an exhaust stroke. The foregoing description assumes the combustion cycle of the engine 10 starts while the piston 14 is fully extended upward into the piston chamber 18, which is typically referred to as "top dead center" or TDC. During the intake stroke, a rotation of the crankshaft (illustrated by clockwise arrow 34) pulls the piston 14 out of the compression chamber 30 in a downward intake stroke (in the direction of arrow 38), creating a vacuum in the compression chamber 30. The vacuum draws in air from the sealable intake passage 22, which is unsealed due to the opening of the intake valve 26 (illustrated in dotted line 40) and timed to correspond with the intake stroke.

Once the piston 14 reaches the lowest point of its intake stroke (illustrated in dotted line 36), the intake valve 26 is sealed, and the piston begins an upward compression stroke. The compression stroke slides the piston 14 into the pressure chamber 30 compressing the air. At the TDC position of the compression stroke 42, the fuel spray nozzle 32 can inject diesel fuel into the compression chamber 30. Alternatively, a combustible fuel can be added to the intake air prior to the intake stroke, or fuel can be added to the compression chamber 30 during the compression stroke 42.

Combustion can occur in the compression chamber due to the high heat and high pressure of the compressed air/fuel mixture (for example, in a diesel engine), or, alternatively, due to external ignition, such as a spark generated by a spark plug (for example, in a gasoline or natural gas engine) in the compression chamber 30.

During the combustion stroke, the explosion of the air/fuel mixture generates heat in the compressed gases, and the resulting expansion of the explosion and expanding gases drives the piston in a downward stroke, away from the compression chamber 30. The downward stroke mechanically drives the rotation 34 of the crankshaft 12.

Following the combustion, the exhaust valve 28 is unsealed to correspond with the exhaust stroke, and the piston is driven upward into the compression chamber 30 to push the combusted, or exhaust gases, out of the compression chamber 30. Once the piston 14 returns to the TDC position in the piston chamber 18, the combustion cycle of the engine 10 can then be repeated.

While a typical combustion engine 10 can have a set of pistons 14 and piston chambers 18, a single piston 14 is illustrated and described here for brevity. It will be understood that "a set" as used herein can include any number including only one. In a combustion engine 10 with multiple pistons 14, the pistons 14 can be configured along the crankshaft 12 to stagger the piston 14 strokes, such that one or more pistons 14 can be continuously providing a driving force to rotate the crankshaft 12, and thus drive the pistons 14 through additional combustion cycle strokes. The mechanical force generated by the rotation of the crankshaft 12 can be further delivered to drive another component, such as a generator, wheels, or a propeller.

Figure 3:
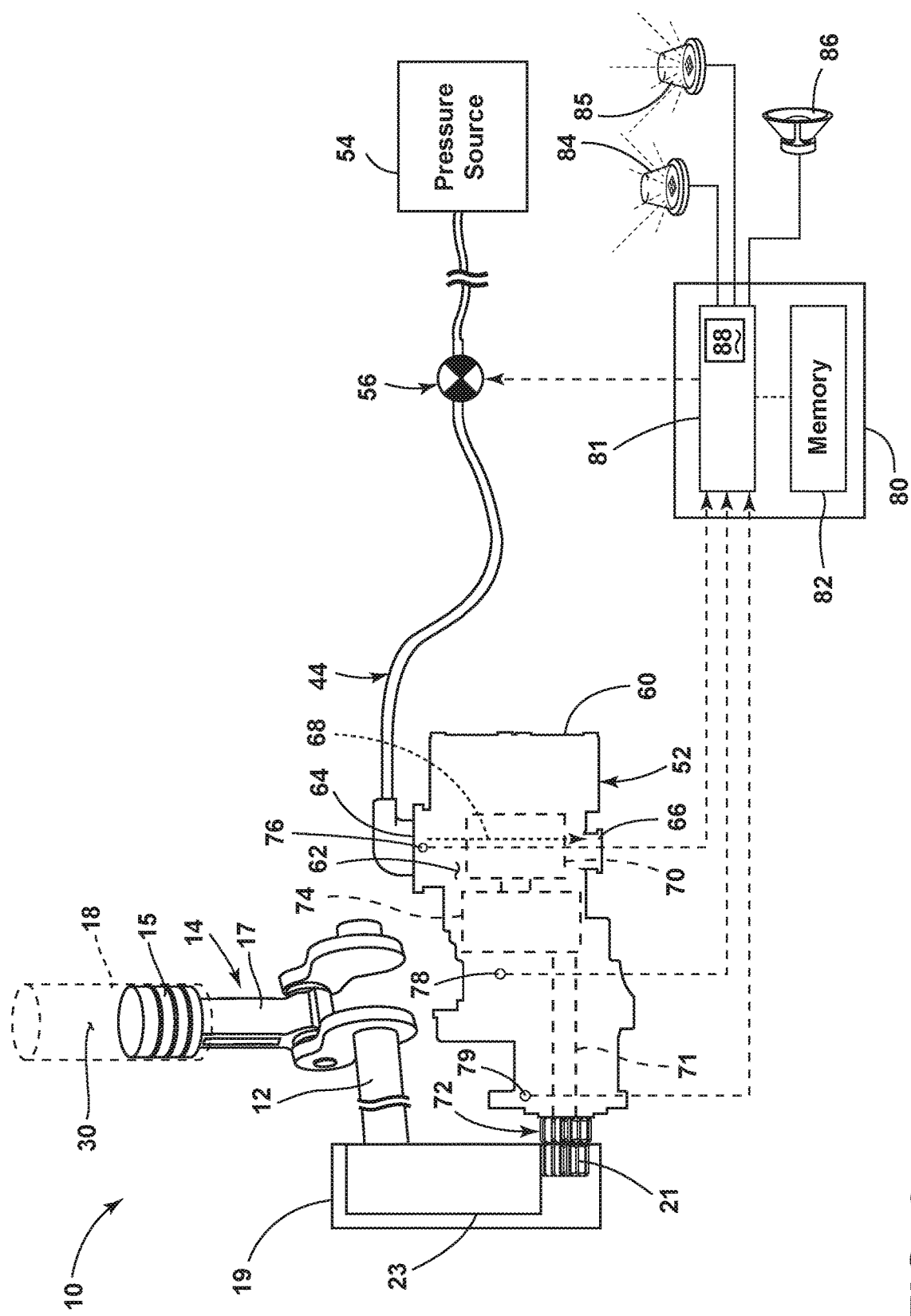
FIG. 3 is a partially schematic view of an air starting assembly rotationally coupled with the crankshaft of the engine of FIGS. 1 and 2, in accordance with various aspects described herein.

FIG. 3 illustrates an exemplary schematic configuration of a starting system 44 such as for the combustion engine 10. The starting system 44 can include a turbine air starter assembly 52 fluidly coupled with a pressure source 54 via a control valve 56. A housing 60, rotatable turbine 70, rotatable shaft 71, pinion gear 72, gear train 74, pressure sensor 76, speed sensor 78, a torque sensor 79, and controller module 80 can be included within the turbine air starter assembly 52. More specifically, the housing 60 defines an interior 62 with an air inlet 64 and an air outlet 66 defining a flow path 68 through the housing 60. The rotatable turbine 70 is located within the flow path 68 within the interior 62.

The rotatable pinion gear 72 extends exteriorly of the housing 60 and is operably coupled to the rotatable turbine 70 such that rotation of the rotatable turbine 70 causes rotation of the rotatable pinion gear 72. By way of non-limiting example, the gear train 74 and rotatable shaft 71 can couple the rotatable turbine 70 to the rotatable pinion gear 72. The rotatable pinion gear 72 is further configured to operably couple to the crankshaft 12 of the combustion engine 10. In the illustrated example, the rotatable pinion gear 72 includes a set of teeth keyed to mesh with the spline gear 21 of the gearbox 19, which is operably coupled to the crankshaft 12. Embodiments of the invention are envisioned wherein the turbine air starter assembly 52 is, for example, mechanically or removably mounted to the combustion engine 10. Alternatively, the turbine air starter assembly 52 can be capable of controllably extending and retracting the rotatable pinion gear 72 portion of the turbine air starter assembly 52. Additional configurations are envisioned.

The pressure sensor 76 can be configured to sense or measure air pressure at the air inlet 64. In this manner, the pressure sensor 76 can provide a pressure output indicative of air pressure at the air inlet 64 to the controller module 80. The speed sensor 78 can be configured to sense, measure, or estimate a rotational speed the pinion gear 72, gear train 74, or rotatable turbine 70. The speed sensor 78 can provide a speed output indicative of the rotational speed of at least one of the pinion gear 72, gear train 74, or rotatable turbine 70 to the controller module 80. The torque sensor 79 can be configured to sense, measure, or estimate a torque experienced by the pinion gear 72, gear train 74, or rotatable turbine 70. The torque sensor 79 can provide a torque output indicative of the torque experienced by at least one of the pinion gear 72, gear train 74, or rotatable turbine 70 to the controller module 80.

The controller module 80 can be configured to obtain, acquire or otherwise receive the pressure output, the speed output, and the torque output, and operate a starting sequence for the combustion engine 10, wherein the air starter 52 rotationally drives the crankshaft 12 of the engine 10 until the engine 10 attains a self-sustaining operating rotational speed. While the controller module 80 has been illustrated as separate from the housing 60 it will be understood that the controller module 80 can alternatively be incorporated within the housing 60 or be mounted thereto. The controller module 80 can also be configured to output a signal indicative of the starting sequence.

By way of non-limiting example, the controller module 80 can include a processor 81 configured to monitor the starting sequence for the combustion engine 10. The starting sequence for the combustion engine 10 can include monitoring the speed output, the pressure output, or the torque output, and repeatedly comparing the speed output, the pressure output, or the torque output to a start sequence profile. The starting sequence for the combustion engine 10 can also include repeatedly determining whether the speed output, the pressure output, or the torque output exceeds a start sequence profile threshold. As used herein, a start sequence profile can include a set of profiles, including, but not limited to a start sequence speed profile, a start sequence pressure profile, or a start sequence torque profile.

The controller module 80 can further include memory 82 in which is stored operational start sequence profile(s), for operating the turbine air starter assembly 52 to determine whether the speed output, the pressure output, or the torque output exceeds a start sequence profile threshold. The memory 82 can include random access memory (RAM), read-only memory (ROM), flash memory, or one or more different types of portable electronic memory, such as discs, DVDs, CD-ROMs, etc., or any suitable combination of these types of memory. The controller module 80 can be operably coupled with the memory 82 such that one of the controller module 80 and the memory 82 can include all or a portion of a computer program having an executable instruction set for controlling the operation of the pressure valve 56, turbine air starter assembly 52, and/or the operating method. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions can include, for example, instructions and data, which cause a general purpose computer, special purpose computer, controller module 80, or special purpose processing machine to perform a certain function or group of functions. In implementation, the pressure threshold and speed threshold can be converted to an algorithm, which can be converted to a computer program comprising a set of executable instructions, which can be executed by the processor 81.

The aforementioned start sequence profiles can include, for example, one or more threshold values, threshold value ranges, or time or sequence-dependent threshold values, that is, threshold values that vary over a starting sequence period of time.

In one example, the start sequence speed threshold value can include a predetermined rotational speed value or a target rotational speed, wherein the combustion engine 10 attains self-sustaining operating rotational speed, and thus, the starting sequence can cease. In another example, the start sequence speed threshold value can include a predetermined maximum rotational speed value indicative of an overspeed condition of the combustion engine 10. In this example, the start sequence speed threshold value can alternatively include a predetermined rotational speed range that is bounded, limited, or defined by the se-sustaining operating rotational speed on the low side of the range and the maximum rotational speed value indicative of an overspeed condition on the high side of the range. In yet another example, the start sequence speed threshold can include a starting sequence speed profile, wherein the profile defines a set of speed profile values relative to the starting sequence period of time. In this sense, the start sequence speed threshold can include a speed profile wherein a first target speed value after a first period of time (i.e. 3 seconds) is less than a second target speed value at a second period of time, where the second period of time is after or later than the first period of time (i.e. 5 seconds). Additional or alternative start sequence speed threshold values or ranges can be included.

In another example, a start sequence torque threshold value can include a predetermined maximum torque value indicative of a maximum amount of torque applied to at least one of the pinion gear 72, gear train 74, or rotatable turbine 70 without causing damage to the starter 52 or at least one of the aforementioned components 72, 74, 70. In another example, the start sequence torque threshold can include a starting sequence torque profile, wherein the profile defines a set of torque profile values relative to the starting sequence period of time. In this sense, the start sequence torque threshold can include a torque profile wherein a maximum torque value is related to a first period of time (i.e. 3 seconds), and wherein the maximum torque value increases, decreases, or is modified proportionately, after a second period of time, later than the first period of time (i.e. 5 seconds).

Embodiments of the disclosure can further include examples wherein at least one of the start sequence profile, the start sequence speed profile, the start sequence pressure profile, or the start sequence torque profile is related to acceleration or a rate of acceleration of the pinion gear 72, gear train 74, or rotatable turbine 70.

The controller module 80 is also shown further coupled with optional indicators capable of outputting a human-detectable signal to alert a user to the condition of the starting sequence of the combustion engine 10. It can be easily understood that a human-detectable signal is any signal capable of being detected by a user. Such indicators can include a visible or light-type indicator or an audible-type indicator or any combination of visible or audible human-detectable signals.

Examples of light type indicators can include an incandescent lamp, a light emitting diode (LED), or an array of several LEDs. It should be noted that the light type indicator can produce a single light pulse or a series of light pulses. Examples of audible indicators can include any suitable sound generator capable of producing a beep, a series of beeps, an audible sound, or voice messages. In the illustrated example, an alarm light 84, an OK to start engine light 85, and a speaker 86 are illustrated as being operably coupled with the controller module 80 or processor 81. The controller module 80 or the processor 81 can also be configured to relay or send indicia or information regarding the condition of the starting sequence for the combustion engine 10. By way of non-limiting example, a text, an email, or another type of message can be transmitted to a user or sent to a database for storage or processing.

Further still, a response module 88 can be included either as a portion of the controller module 80, as illustrated, or separate therefrom. The response module 88 can be configured to receive the signal indicative of the condition of the starting sequence from the controller module 80. Alternatively, the response module 88 can also relay information or control the optional indicators 84, 85, and 86.

While a pressure sensor 76, speed sensor 78, and torque sensor 79 are shown and described, embodiments of the disclosure can include measuring, sensing, calculating, or estimating at least one of the rotational speed or torque experienced by way of a subset of the sensors 76, 78, 79. For example, the processor 81 can be configured to determine, calculate, or estimate a set of values or parameters related to the speed, pressure, or torque. Thus, direct sensing or measuring of the speed, pressure, or torque can be optional. In one embodiment of the disclosure, the rotational speed of at least one of the pinion gear 72, gear train 74, or rotatable turbine 70 can be estimated by the controller module 80 or processor 81 using the provided output of the pressure sensor 76 or torque sensor 79. In another example embodiment of the disclosure, the torque experienced by the pinion gear 72, gear train 74, or rotatable turbine 70 can be estimated by the controller module 80 using the provided output of the speed sensor 78. Additional examples of estimating one or more of the pressure, speed, or torque can be included.

The pressure valve 56 can include a controllable relay valve capable of regulating the air pressure supplied by the pressure source 54 to the turbine air starter assembly 52, in response to a control signal supplied by the controller module 80. In this sense, the pressure valve 56 is located upstream from the pinion gear 72, gear train 74, and rotatable turbine 70. The pressure valve 56 can further include a pressure sensor 76 capable of sensing or measuring the air pressure supplied to the turbine air starter assembly 52, and generating an analogue or digital signal representative of the air pressure supplied to the turbine air starter assembly 52. The pressure valve 56 can further provide this pressure sensor 76 signal to the controller module 80, for instance, as part of a feedback loop to ensure proper pressure valve 56 operation.

During operation of a start sequence of the combustion engine 10, the turbine air starter assembly 52 and pressure valve 56 operate to generate force, such as a torque at the rotatable pinion gear 72, in response to a provided supply of air pressure. The torque generated by the turbine air starter assembly 52 is applied (via the gearbox 19 and crankshaft 12) to generate the compression force used by the compression stroke to compress the contents of the compression chamber 30 (sans combustion), as explained above. The air supplied by the pressure valve 56 to the turbine air starter assembly 52 can be variable, including non-continuous, due to the low speed operation necessary for adequate starting sequence performance. For example, the controller module 80 can control the pressure valve 56 to provide bursts of supply air to keep the combustion engine 10 rotating at predicted or target speed. Additionally, the controller module 80 can control the pressure valve 56 to provide continuous or increasing amounts of supply air to rotate or accelerate the combustion engine 10 according to the start sequence profile.

While the starting sequence of the engine 10 is occurring, the controller module 80 can receive sensor outputs, including, but not limited to, the pressure output from the pressure sensor 76, the speed output from the speed sensor 78, and the torque output from the torque sensor 79. The controller module 80 can monitor the sensor outputs and repeatedly compare the outputs with corresponding start sequence profile thresholds, ranges, or values to determine if the starting sequence is operating as expected, and if some further action or controlling of the starting sequence will occur. In a first example, in one embodiment of the disclosure, For example, the controller module 80 can repeatedly compare or repeatedly determine whether the monitored speed parameter exceeds or satisfies a start sequence speed profile while simultaneously repeatedly comparing or repeatedly determining whether the monitored torque parameter exceeds or satisfies a start sequence torque threshold. In this first example embodiment, the start sequence speed profile can include target rotational speed or speed profile for the starting sequence, and can be related to a period of time, as explained above. Additionally, the start sequence torque profile can include a maximum torque value, as explained above.

In response to satisfying the comparison, or in response to the determination that the monitor speed parameter does not exceed the start sequence speed profile and the monitored torque parameter does not exceed the start sequence torque threshold, the controller module 80 in this first example embodiment can controllably increase the rotational speed of the air starter 52, for example, by controllably operating the control valve 56 to increase the supply air to the rotatable turbine 70. By increasing the supply air to the rotatable turbine 70, the air starter 52 can controllably or operably accelerate the rotation of the pinion gear 72 and crankshaft 12 of the combustion engine 10. The controllable increase of the rotational speed of the air starter 52, by the controller module 80, can also account for, or be configured to increase the rotational speed of the starter 52, while preventing the monitored torque parameter from satisfying or exceeding the start sequence torque threshold of the start sequence profile. Stated another way, while the rotational speed of the air starter 52 or the combustion engine 10 is below the speed profile, the controllable module 80 can increase the rotational speed so long as the torque threshold value is not exceeded.

In a second example embodiment of the disclosure, the controller module 80 can control the rate of acceleration of the air starter 52 or the pinion gear 72 rotatably coupled with the combustion engine 10 while monitoring the torque parameter indicative of torque experienced by the pinion gear 72 during the controlled rate of acceleration. During this time, the controller module 80 can further repeatedly compare or repeatedly determine whether the monitored torque parameter exceeds or satisfies a start sequence torque threshold. In response to satisfying the comparison, or in response to the determination that the monitored torque parameter exceed the start sequence torque threshold, for example, indicating that damage can occur to the air starter 52, the controller module 80 can controllably reduce the rotational speed or rate of acceleration of the air starter 52 or pinion gear 72, by controlling the controllable valve 56 to reduce the air supply to the starter 52. Alternatively, the controller module 80 can controllably maintain the rotational speed of the starter 52 or pinion gear 72, by controlling the controllable valve 56 to maintain the air supply to the starter 52.

The controller module 80 can then continue the method of operating the air starter 52 to increase the rotational speed or rate of acceleration at a later period of time, wherein the torque parameter does not exceed or does not satisfy the start sequence torque threshold. Stated another way, while the torque experienced by the combustion engine 10 or the air starter 52 is greater than the torque threshold, the rate of acceleration of the pinion gear 72 is controllably reduced to prevent damage to the engine 10 or starter 52.

The above-described example embodiments of the disclosure can also controllably operate in accordance with additional considerations. For example, the methods of control described can be configured to ensure the combustion engine 10 attains the target rotational speed or attains the self-sustaining operating rotational speed prior to an expiration of a target period of time, defined by the start sequence profile. Additionally, the method of control can ensure the combustion engine 10 attains the target rotational speed or attains the self-sustaining operating rotational speed prior to an expiration of a target period of time without knowledge of, or without regards to the combustion engine 10, itself. For example, the embodiments of the disclosure can operate a method to operate the starting sequence for any combustion engine 10 that can be rotationally coupled with the air starter 52.

In yet another example embodiment of the disclosure, the controller module 80 can repeatedly monitor the speed parameter and repeatedly determine whether the monitored speed parameter exceeds a maximum speed threshold indicative of an overspeed condition of the combustion engine 10. The controller module 80, in response to determining an overspeed condition of the combustion engine 10 exists, can controllably decrease the rate of acceleration of the air starter 52 or cease the start sequence.

The above-described example embodiments of the disclosure can further operate such that the controller module 80 can control the starting sequence until the combustion engine 10 attains a self-sustaining operating rotational speed, for example, as defined in the start sequence profile, and then ceasing the method of operation. The controller module 80 can further be configured to provide indicia of the completion of the starting sequence. By way of non-limiting example, the indicia can be in the form of visual indicia, such as blinking light, or audible indicia, such as an alarm or sound, on either of the alarm light 84 or speaker 86. By way of further non-limiting examples, the indicia can include text, email or other message notifications transmitted to a user or sent to a database for storage or processing. The controller module 80 can also be configured to output a signal to the response module 88 or a separate controller, that the combustion engine 10 has been started.

Alternatively, the above-described example embodiments can operate such that upon satisfaction of a comparison or a determination that a monitored value exceeds the start sequence profile, the starting sequence can be ceased, stopped, aborted, or prevented from attaining self-sustaining operating rotational speed. In this alternative configuration, the controller module 80 can provide indicia of the ceasing of, or failure of, the starting sequence. By way of non-limiting example, the indicia can be in the form of visual indicia, such as blinking light, or audible indicia, such as an alarm or sound, on either of the alarm light 84 or speaker 86. By way of further non-limiting examples, the indicia can include text, email or other message notifications transmitted to a user or sent to a database for storage or processing. The controller module 80 can also be configured to output a signal to the response module 88 or a separate controller, of the ceasing or failure of the starting sequence.

While a first example embodiment and a second example embodiment have been described, further embodiments of the disclosure can include a combination of the above-described examples. For instance, an alternative to the first example embodiment can include controllably decreasing the rotational speed of the air starter 52, or controllably maintain the rotational speed of the starter 52, by the controller module 80, in response to determining the monitored torque parameter exceeds the start sequence torque threshold. In another instance, an alternative to the second example embodiment can include repeatedly monitoring the speed parameter and repeatedly determining whether the monitored speed parameter exceeds a start sequence speed profile.

As used herein, the term "satisfies" is used herein to mean that the output satisfies the corresponding predetermined threshold or range, such as being equal to, less than, or greater than the corresponding predetermined threshold. It will be understood that such a determination can easily be altered to be satisfied by a positive/negative comparison or a true/false comparison.

Figure 4:
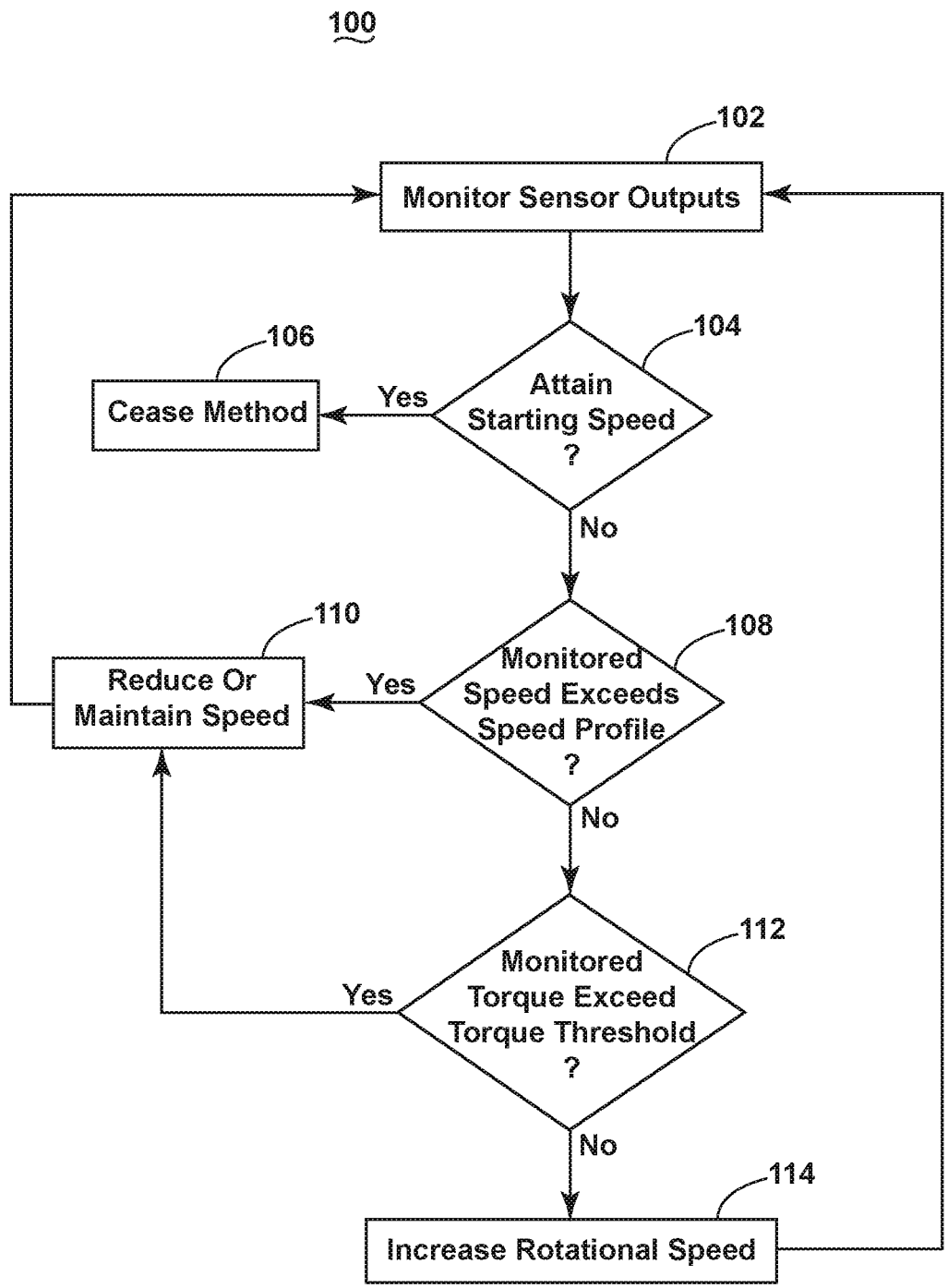
FIG. 4 is a flow chart illustrating a method of starting a combustion engine in accordance with various aspects described herein.

In accordance with an example embodiment of the disclosure, FIG. 4 illustrates a method 100 for starting a combustion engine 10 with a starter, such as the air starter 52. The method 100 includes monitoring the sensor outputs 102. For example the sensor outputs can include a value representative of or indicative of a sensed pressure (e.g. from the pressure sensor 76), a value representative of or indicative of a sensed speed (e.g. from the speed sensor 78), a value representative of or indicative of a sensed torque (e.g. from the torque sensor 76), or a combination thereof, as explained herein. The method 100 then proceeds to determine if the combustion engine 10 has attained a starting speed 104, such as a self-sustaining operating rotational speed. If the combustion engine 10 has attained the starting speed (Yes at 104), then the method ceases 106. If the combustion engine 10 has not yet attained the starting speed (No at 104), then the controller module 80 determines whether the monitored speed parameter exceeds a corresponding speed value included in a speed profile 108 at a given time. If the speed parameter exceeds the corresponding speed value of the speed profile (Yes at 108), then the method 100 continues such that the controller module 80 can, for example, stop, reduce, or maintain the speed 110 of the air starter 52. After reducing, stopping, or maintaining the speed 110, the method 100 returns to monitoring the sensor outputs 102. Alternatively, the method 100 can optionally cease 106 instead of reducing, stopping, or maintaining the speed 110.

If it is determined that the speed parameter does not exceed the corresponding speed value of the speed profile (No at 108), then the controller module 80 determines whether the monitored torque parameter exceeds the torque threshold 112. If it is determined that the torque parameter exceeds the torque threshold (Yes at 112), then the controller module 80 can, for example, stop, reduce, or maintain the speed 110 of the air starter 52. If it is determined that the torque parameter does not exceed the torque threshold (No at 112), then the method 100 continues to controllably increase the rotational speed 114 of the air starter 52, and the method 100 can return to monitoring the sensor outputs 102.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

The term "start sequence" and "starting sequence" as used herein includes a sequence that causes movement of the piston 14 in the piston chamber 18 without any combustion. Further, the term "start sequence" can be considered a pre-start sequence, that is, operations prior to attempting to start the engine 10 into a self-sufficient operating mode, including prior to a compression stroke in the combustion engine 10. During the sequence, the combustion engine 10 can disable aspects of the combustion cycle that would result in the combustion of the fuel. For example, the combustion engine 10 can disable the injection of fuel, operation of spark plugs, etc., such that the air starter 52 can effect a movement of the piston 14 in the piston chamber 18 through the combustion cycle, without any combustion.

Figure 5:
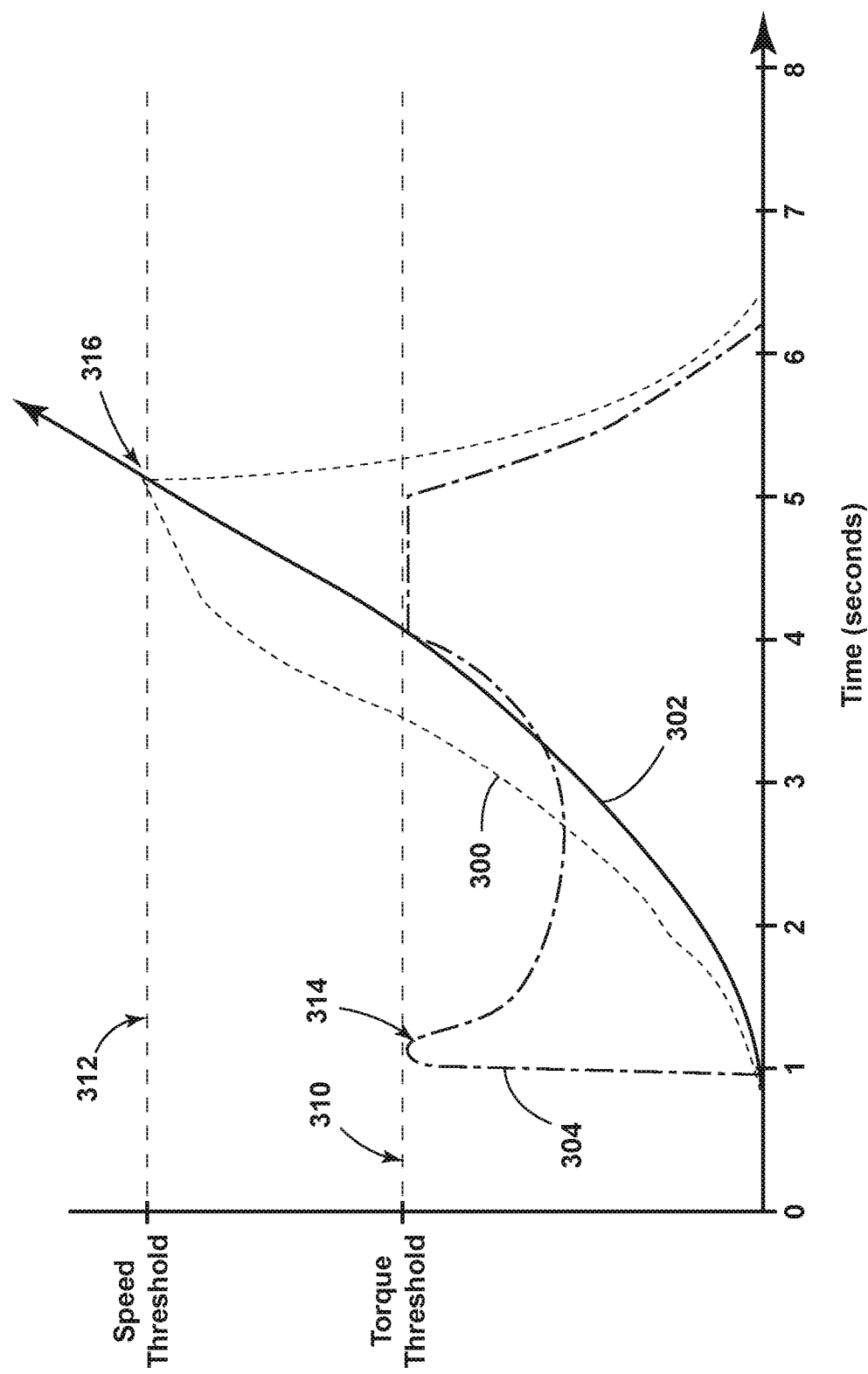
FIG. 5 is a set of example plots illustrating exemplary pressure, speed, and torque outputs of a starter, such as that illustrated in FIG. 3, in starting sequence in accordance with various aspects described herein.

FIG. 5 illustrates a set of example plots, illustrating a starting sequence method wherein no errors occur, and the engine is started. The graphs provided are intended to illustrated one non-limiting example of the method, as described, and do not specifically represent any necessary signals, sensors, values, or operations of the method. A first graph 300 illustrates the pressure output indicative of air pressure at the air inlet 64 over time. A second graph 302 illustrates the speed of the combustion engine 10. A third graph 304 illustrates the torque experienced by at least one of the pinion gear 72, the gear train 74, or the rotatable turbine 70. Additionally, the example plots illustrate a torque threshold profile 310 indicating a predetermined maximum amount of torque experienced without damaging the combustion engine 10 or the air starter 52, and a speed threshold profile 312 indicating a self-sustaining operating rotational speed for the engine 10.

Initially, the controller module 80 can turn on the air starter 52, and begin supplying air pressure 300. In the illustrated example, the pressure 300 is increased such that the air starter 52 generates a torque, which begins to rotate the combustion engine 10 as shown in the trailing increase in the rotational speed 302 of the combustion engine 10. As shown, an initial spike 314 in torque coincides with the start of the rotation 302 of the engine 10. In this sense, the initial spike 314 in torque 304 is to break the initial inertial load of the combustion engine 10. The controller module 80 can controllably operate the controllable valve to ensure the initial spike 314 does not exceed the maximum torque threshold 310.

The controller module 80 continues to increase the air pressure 300 until the torque 304 reaches the maximum torque threshold 310, after which the controller module 80 controls the controllable valve 56 to reduce the rate of increase of the air pressure 300 such that the torque 304 does not exceed the maximum torque threshold 310. The rotational speed 302 of the engine 10 continues to increase until the speed 302 reaches the speed threshold 312 at point 316. After the rotational speed 302 of the engine 10 reaches point 316, the engine 10 can be started, and can further increase rotational speed 302 in a self-sustaining operation. Once the engine has been started, the controller module 80 can cease the method, for example, decreasing the air pressure 300 and torque 302.

Many other possible embodiments and configurations in addition to that shown in the above figures are contemplated by the present disclosure. For example, the combustion engine can include a continuous combustion engine, such as a gas turbine engine. In this example, the gas turbine engine can have a rotatable rotor, as opposed to a crankshaft, which can be rotationally coupled with an air starter for operating a starting sequence. In another example, the engine starter can include an electric starter or a hydraulic starter, as opposed to an air or pneumatic starter. The above-described methods can be equally applied to any of the alternative embodiments and configurations described herein.

The embodiments disclosed herein provide a combustion engine starter and methods for starting a combustion engine. The technical effect is that the above-described embodiments enable the application of a force to rotate a rotatable element in the combustion engine to effect the starting of the combustion engine without damaging the starter or the engine. One advantage realized by the above-described embodiments is that the apparatus and method reduces the occurrence of starter, turbine, or pinion breaks that can occur under exposure of high levels of torque. In this sense, by holding the torque levels under a torque threshold, the starter assembly can experience fewer damaging occurrences, such as pinion breaks. Additionally, the methods described herein can limit the rotating speed of the starter assembly or combustion engine to prevent overspeed conditions during the starting sequence.

Additionally, by using a controller module to monitor the various sensor outputs obtained from the turbine air starter assembly, and controlling the controllable valve, the starting sequence can operate more effectively than other known methods. More effective operation can include reducing the amount of time needed to attain self-sufficient operating rotational speed, or ensuring completion of the starting sequence in a predetermined period of time. Additionally, the more effective operation of the starting sequence can occur regardless of the combustion engine type, size, manufacturer, and the like. Yet another advantage of the above-described embodiments is that the method provides for indicia to a user that the starting sequence has completed successfully, or that a problem has occurred.

To the extent not already described, the different features and structures of the various embodiments can be used in combination with each other as desired. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of starting a combustion engine started with a starter, the method comprising:
   during a start sequence of the combustion engine, monitoring, by a controller module, a speed parameter indicative of a rotational speed of the starter rotationally coupled with the combustion engine and a torque parameter indicative of a torque of the starter;
   determining, in the controller module, whether the monitored speed parameter exceeds a corresponding speed value included in a start sequence speed profile and whether the monitored torque parameter exceeds a predetermined torque threshold indicative of causing damage to a pinion of the starter; and
   in response to determining the monitored speed parameter does not exceed the corresponding speed value of the start sequence speed profile and the monitored torque parameter does not exceed the predetermined torque threshold, controllably increasing the rotational speed of the starter by the controller module such that the increasing prevents the monitored torque parameter from satisfying the predetermined torque threshold.

2. The method of claim 1 wherein monitoring the torque parameter further comprises monitoring a torque experienced by a gear train of the starter.

3. The method of claim 2, further comprising determining whether the monitored torque experienced by the gear train exceeds a predetermined torque threshold indicative of causing damage to the gear train.

4. The method of claim 1, further comprising determining whether the monitored speed parameter exceeds a target rotational speed prior to expiration of a target period of time.

5. The method of claim 4, further comprising determining whether the monitored speed parameter exceeds the target rotational speed prior to the target period of time.

6. The method of claim 1 wherein the monitoring the torque parameter of the starter includes monitoring the torque parameter of at least one of an electric starter, pneumatic starter, or hydraulic starter.

7. The method of claim 6 wherein the monitoring the torque parameter of the pneumatic starter includes monitoring the torque parameter of a turbine air starter.

8. The method of claim 7 wherein the controllably increasing the rotational speed of the starter includes controlling a valve to provide a pressurized air supply to the turbine air starter.

9. The method of claim 1, further comprising ceasing the increasing of the rotational speed of the starter when the combustion engine attains a self-sustaining operating rotational speed.

10. The method of claim 1, further comprising determining whether the monitored torque parameter exceeds the predetermined torque threshold.

11. The method of claim 1, further comprising in response to determining the monitored torque parameter exceeds the predetermined torque threshold, at least one of: controllably decreasing the rotational speed of the starter by the controller module, controllably maintaining the rotational speed of the starter by the controller module, or ceasing the start sequence by the controller module.

12. The method of claim 1, further comprising determining whether the monitored speed parameter exceeds the corresponding speed value included in the start sequence speed profile, where the corresponding speed value is indicative of attaining a self-sustaining operating rotational speed and ceasing the increasing of the rotational speed of the starter when the combustion engine attains the corresponding speed value.

13. The method of claim 1, wherein monitoring the torque parameter further comprises monitoring a torque experienced by a rotatable turbine of the starter.

14. The method of claim 13, further comprising determining whether the monitored torque experienced by the rotatable turbine exceeds a predetermined torque threshold indicative of causing damage to the rotatable turbine.

* * * * *